INVENTORS.
JOSEPH F. MARTIN
FRANK NIERTIT
BERNARD H. ROOT
BY Robert Nathans
ATTORNEY Jan. 1, 1963 J. F. MARTIN ETAL 3,071,732

PULSE TRAIN DETECTOR

Filed May 1, 1961 2 Sheets-Sheet 2

3,071,732

PULSE TRAIN DETECTOR

Joseph F. Martin, Webster, Frank Niertit, Rochester, and Bernard H. Root, Palmyra, N.Y., assignors to General Dynamics Corporation, Rochester, N.Y., a corporation of Delaware Filed May 1, 1961, Ser. No. 106,653
7 Claims. (Cl. 328—112)

The present invention relates to pulse train detectors.

It is an object of the present invention to provide a new and improved pulse train detector for producing an output signal having a first voltage level in the presence of a pulse train, and for producing an output signal having a second voltage level in the absence of the pulse train.

It is a further object of the present invention to provide a new and improved pulse train detector utilizing a delay line for timing purposes in connection with a bistable element where variations in the delay time of the line do not adversely affect the operation of the pulse train detector.

Further objects and advantages of the invention will become apparent as the following description proceeds and the features of novelty which characterize the invention will be pointed out with particularity in the claims annexed to and forming a part of this specification.

Figure 1:
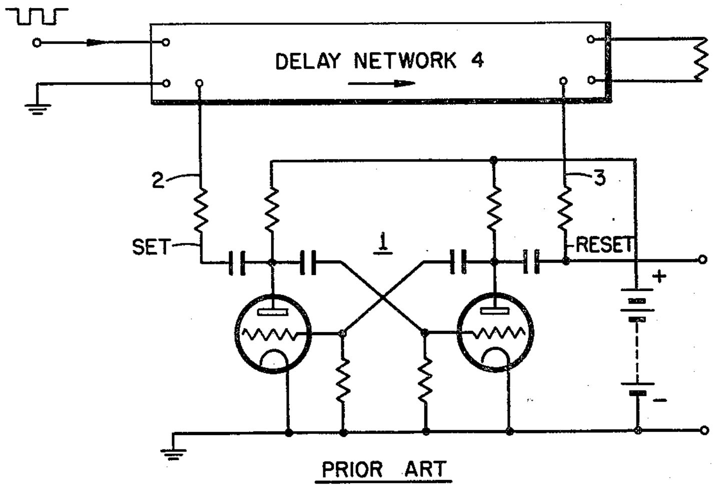
Figure 2:
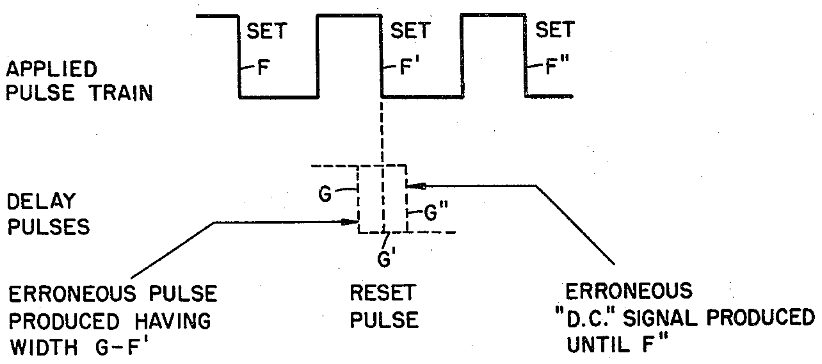
Figure 3:
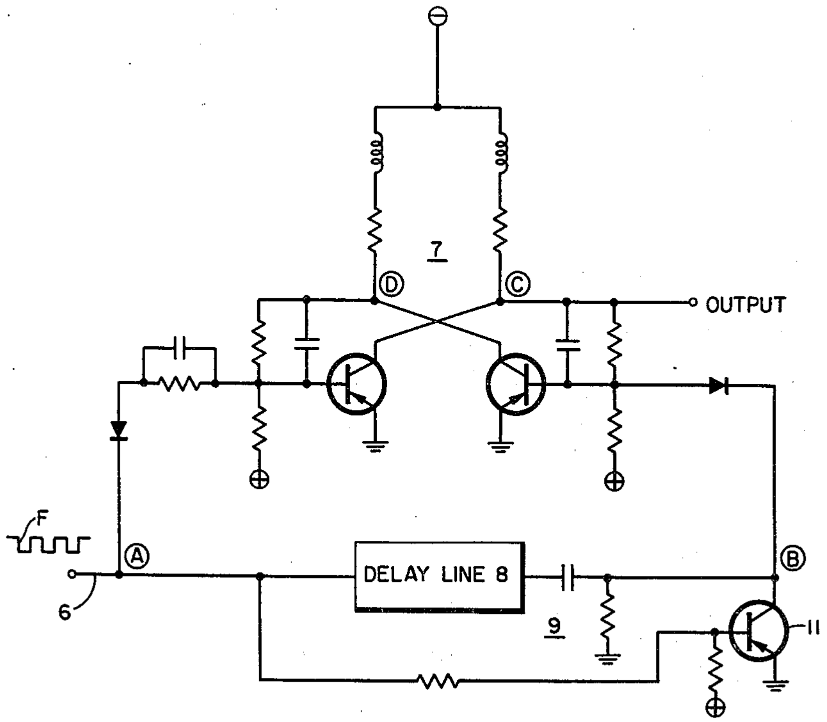

For a better understanding of the invention, reference may be had to the accompanying drawings in which:

FIGURE 1 discloses a circuit which has been utilized in the past as a pulse train detector;

FIGURE 2 discloses a pulse diagram illustrating the operation of the prior art circuit disclosed in FIGURE 1;

FIGURE 3 discloses an embodiment of the present invention; and

Figure 4:
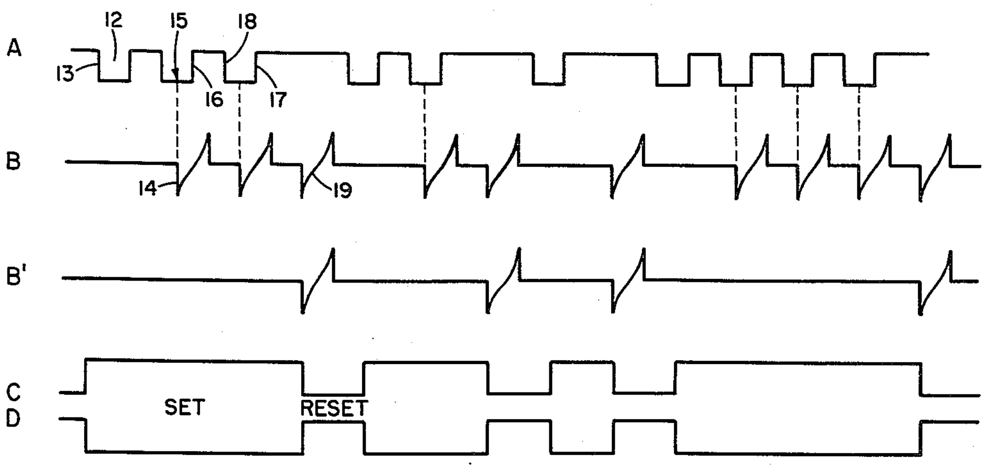

FIGURE 4 discloses a pulse diagram which illustrates the operation of the embodiment of FIGURE 3.

Referring now to FIGURE 1 of the drawings, a flip-flop 1 is disclosed having a first input circuit 2 and a second input circuit 3. Input circuit 2 is connected to the input circuit of delay network 4 so that the bistable element is set when an impulse is applied to the input circuit of delay network 4. When this impulse emerges from the delay network to be applied to input circuit 3 of flip-flop 1, the flip-flop becomes reset. Delay network 4 is properly terminated so that no reflections occur. This circuit has been utilized to operate as a pulse train detector. The pulse train to be detected is applied to the input circuit of delay network 4. In order to operate this circuit as a pulse train detector, the delay time of delay network 4 must be exactly $i/f$, where $f$ is the frequency of the pulse train, or, in other words, have a delay equal to the period between leading edges of the pulses of the pulse train. The leading edge F of the first impulse applied to the delay network 4, disclosed in FIGURE 2, will cause flip-flop 1 to become set. This leading edge which appears in resetting circuit 3 after a delay period equal to one cycle, will tend to reset flip-flop 1. If a second impulse is present in the input circuit of delay network 4, however, the second impulse will tend to set flip-flop 1 at the exact instant when the flip-flop is tending to be reset by the impulse emerging from the delay line. Accordingly, the resetting action is ineffective and flip-flop 1 remains set. However, upon cessation of the pulse train, the leading edge of the pulse emerging from the delay line resets the flip-flop since a pulse is not present in set circuit 2. The flip-flop again becomes set upon the commencement of the pulse train. Accordingly, the circuit operates as a pulse train detector.

The trouble with utilizing the prior art circuit disclosed in FIGURE 1 as a pulse train detector is that small variations may exist in the delay time of delay network 4.

FIGURE 2 discloses a pulse train which would be applied to the input circuit of delay network 4. The leading edge F of the first negative-going pulse emerges from delay network 4 and may be represented by reset pulse G′, disclosed in FIGURE 2. Leading edge G′ would be, under ideal conditions, coincident with leading edge F′ of the second pulse of the train so that the flip-flop remains set, as explained hereinabove. Under actual conditions, however, variations in the delay time of delay network 4 may occur. In the event that the delay time should be shorter than desired, the leading edge of the first impulse applied to delay network 4 would emerge from the delay network slightly earlier than G′. This leading edge, which may be represented by G in FIGURE 2, would cause the flip-flop 1 to become reset. The flip-flop would then shortly thereafter become set by leading edge F′ so that an erroneous impulse would be produced in the output circuit of flip-flop 1 having a pulse width G—F′. This is, of course, undesirable since the output circuit of the flip-flop is to produce a fixed voltage level as long as a pulse train is being applied to the input circuit of delay network 4.

If the delay time of delay network 4 should be slightly longer than the period of the pulse train, the flip-flop would be reset by G″ since leading edge F′ would not coincide with G″ to nullify its effect. The flip-flop would remain reset until the occurrence of the leading edge F″ of the third impulse of the train. This, of course produces an erroneous D.C. output signal. In summary it should be noted that the use of the circuit of FIGURE 1 as a pulse train detector is impracticable due to small variations in the delay time of the line FIGURE 3 discloses an embodiment of the present invention which eliminates the adverse effect of variations in the delay time of the delay network. Input circuit 6 is coupled to the input circuit of a conventional flip-flop 7 and to the input circuit of delay line 8. The pulse train to be detected is applied to input circuit 6 and leading edge 13 of the first impulse 12, disclosed in FIGURE 4, will cause flip-flop 7 to become set. The leading edge of this impulse will appear in the output circuit of delay line 8 to be differentiated by differentiation circuit 9 to tend to produce a negative-going pip at point B which is directly coupled to the reset circuit of flip-flop 7. Point B, however, may be grounded by transistor 11 so that the negative-going pip is not applied to the reset circuit of flip-flop 7. Whether or not point B is grounded depends upon the voltage applied to the base of transistor 11, which will in turn depend upon whether or not an impulse is present at input circuit 6 (point A) of the pulse detector. Unlike the circuit disclosed in FIGURE 1, the delay time of delay line 8 will be approximately 25% greater than the period $$\left(\frac{i}{f}\right)$$

of the pulse train. Accordingly, the aforementioned negative pip 14, which is produced by the action of differentiator 9 upon the leading edge of the impulse emerging from delay line 8, will be positioned in time coincidentally with the central portion 15 of the second impulse applied to input circuit 6, as shown in FIGURE 4. However, the word "produced," as used in the preceding sentence, is used in a figurative sense only since the presence of this second impulse will cause point B to be grounded so that the pip is not, in fact, applied to the input circuit of flip-flop 7. The negative-going pip will only be present in the resetting circuit of flip-flop 7 upon cessation of the pulse train since no further impulse will be pres ent in the input circuit of the detector to cause point B to be grounded.

The operation of the detector is as follows: let it be assumed that the first negative-going impulse 12 of a pulse train to be detected is applied to the input circuit 6 of the pulse train detector. The negative-going edge 13 of this pulse will cause flip-flop 7 to become set. Since the delay time of delay line 8 is approximately 25% greater than the period of the pulse train, or, in other words, the interval between leading edges of successive pulses in the pulse train, differentiation circuit 9 tends to produce a negative-going pip 14 which will be centered with respect to the second impulse 16 of the train, or, in other words, will be coincident with point 15, as disclosed at B in FIGURE 4. If the second impulse 16 were, in fact, present, a negative potential would be applied to transistor 11 at this time so that point B would be grounded thereby to prevent the application of negative-going pip 14 to the reset circuit of flip-flop 7. Accordingly, as long as the pulse train is uninterrupted, flip-flop 7 remains set. Let it be assumed that impulse 17, of FIGURE 4, is the last impulse of the train. The leading edge 18 of pulse 17 would cause negative-going pip 19 to actually be applied to the reset circuit of flip-flop 7. This is because a negative potential is no longer applied to the base of transistor 11 owing to the absence of a negative-going impulse in the input circuit of the detector. Accordingly, the flip-flop would become reset and would remain reset until the first negative-going impulse of a second pulse train is applied to the input circuit of the detector.

In summary, negative-going pips which are produced by the leading edges of impulses emerging from the delay line are applied to the reset circuit of the flip-flop only upon cessation of the pulse train. Otherwise, the operation of transistor 11 causes the input to the resetting circuit to be grounded to prevent the resetting of flip-flop 7.

By causing the delay time of delay line 8 to be greater than the period of the pulse train (25% greater for 50% duty cycle trains) so that the negative-going pips are "centered" with respect to impulses in the train, as disclosed at A and B in FIGURE 4, small variations in the delay time of delay line 8 will have no effect on the output of the detector. This may readily be seen by visualizing the effect of slightly shifting the impulses at B in time with respect to the pulses at A. It should be observed that such slight shifts which represent variations in the delay time of the delay line 8, would have no effect on flip-flop 7 due to the fact that the pulse widths of the impulses of the train are considerably greater than the slight shifts of the "centered" pips. Of course, if the variations of delay line 8 are great enough to cause the negative-going pips to occur during the period between impulses, erroneous output signals would be produced. However, the variations in delay time of delay line 8 will never be that great under actual operating conditions.

The state of flip-flop 7 would, of course, determine the voltage levels produced at the collectors of the transistors of flip-flop 7, as disclosed at C and D of FIGURE 4.

While there has been disclosed what is at present considered to be the preferred embodiment of the invention, other modifications will readily occur to those skilled in the art. It is not, therefore, desired that the invention be limited to the specific arrangements shown and described, and it is intended in the appended claims to cover all such modifications as fall within the true spirit and scope of the invention.

What is claimed is:

1. In a pulse train detector, a bistable device having a first input circuit for setting said device and a second input circuit for resetting said device, means for delaying an electrical impulse having an input and an output circuit, means for coupling the input circuit of said de lay means to the first input circuit of said bistable devic means for coupling the output circuit of said delay mean to the second input circuit of said bistable device, an control means for preventing an impulse emerging fro said delay means at a particular time from resetting sai device if an impulse of said train is present in the fir input circuit of said bistable device at said particula time regardless of variations in the delay time of said de lay means.

2. The combination set forth in claim 1 wherein sai control means includes a switch having an output circu coupled to the second input circuit of said bistable de vice and having a control circuit coupled to the first ir put circuit of said bistable device.

3. In a pulse train detector, a bistable device having first input circuit for setting said device and a secon input circuit for reseting said device, means for applyin said pulse train to be detected to the first input circuit o said bistable device, delay means having an input circu coupled to the first input circuit of said bistable devic and having an output circuit coupled to the second ir put circuit of said bistable device, and control means fo allowing the pulse emerging from said delay means to b applied to the second input circuit of said bistable de vice at a particular time if an impulse is not present i the input circuit of said bistable device at said particu lar time and for preventing the application of the im pulse emerging from said delay means to the second ir put circuit of said bistable device if an impulse is preser in the first input circuit of said bistable device at sai particular time regardless of variations in the delay tim of said delay means.

4. The combination set forth in claim 3 wherein sai control means includes a switch having an output circu coupled to the second input circuit of said bistable de vice and having a control circuit coupled to the first ir put circuit of said bistable device.

5. In a pulse train detector, a bistable device having first input circuit for setting said device and a secon input circuit for resetting said device, means for applyin said pulse train to be detected to the first input circuit c said bistable device, a differentiation circuit, delay mean having an input circuit coupled to the first input circu of said bistable device and having an output circuit cou pled to the second input circuit of said bistable devic through said differentiation circuit, and control means fc allowing the pulse emerging from said differentiation ci cuit to be applied to the second input circuit of said b stable device at a particular time if an impulse is nc present in the input circuit of said bistable device an for preventing the application of the impulse emergin from said differentiation circuit to the second input ci cuit of said bistable device if an impulse is present in th first input circuit of said bistable device.

6. The combination set forth in claim 5 wherein sai control means includes a switch having an output ci cuit coupled to the second input circuit of said bistabl device and having a control circuit coupled to the fir input circuit of said bistable device.

7. In a pulse train detector, a bistable device havin a first input circuit for setting said device and a secon input circuit for resetting said device, means for delayin an electrical impulse having an input and an output ci cuit, means for coupling the input circuit of said dela means to the first input circuit of said bistable device, differentiation circuit, means for coupling the output ci cuit of said delay means to the second input circuit c said bistable device through said differentiation circui and a switch coupled in shunt relationship with said se ond input circuit and having a control element couple to said first input circuit.

No references cited.